United States Patent Office 3,505,081
Patented Apr. 7, 1970

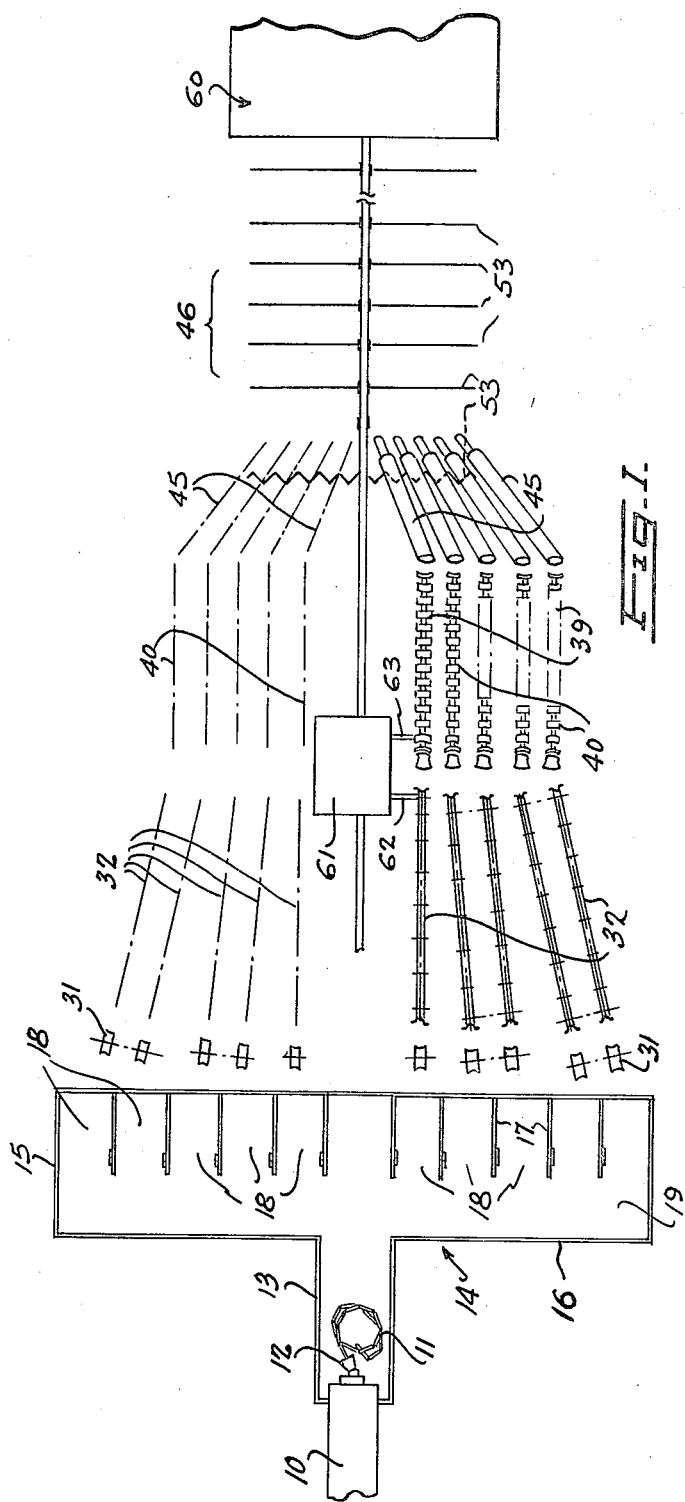

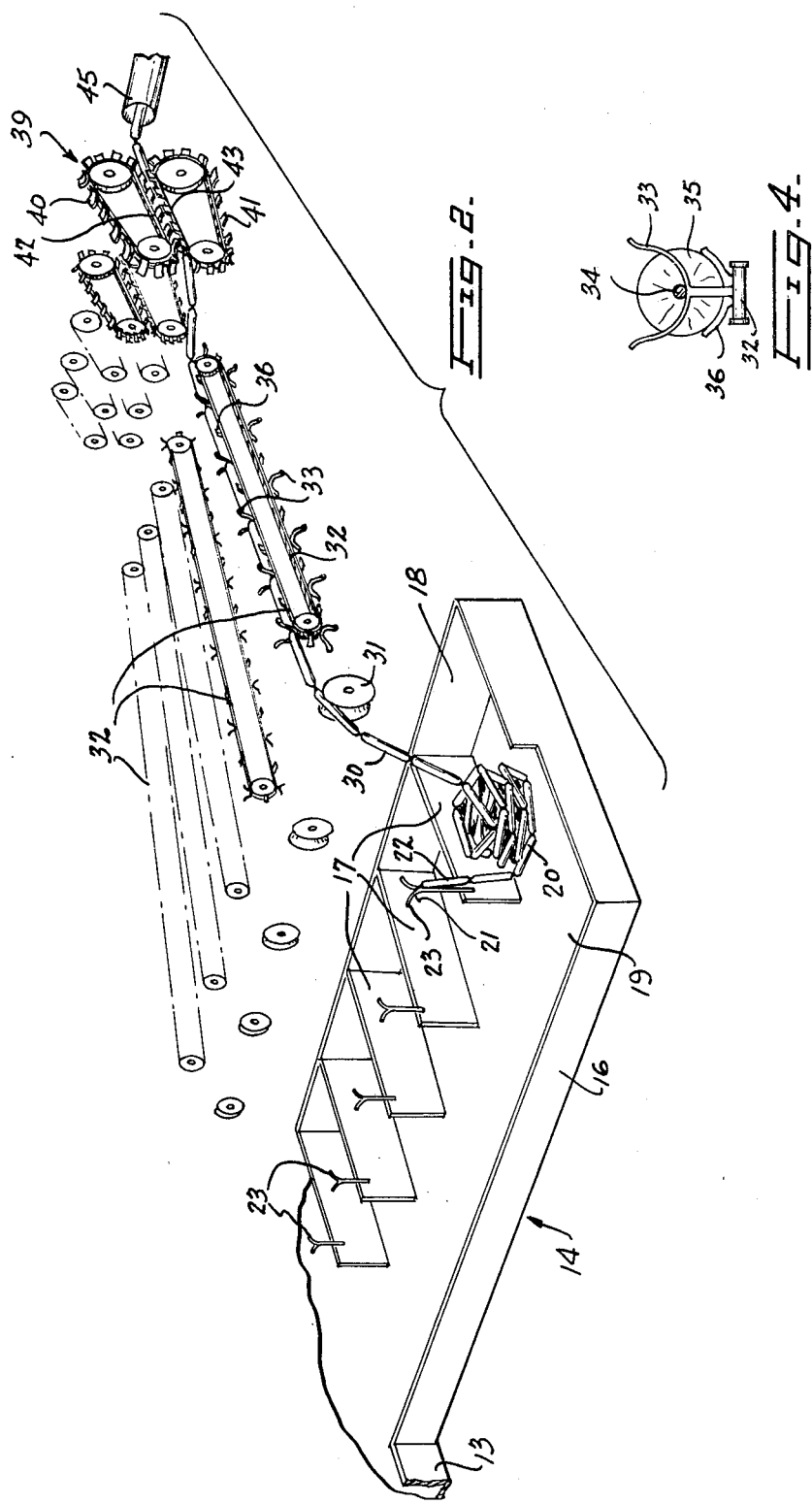

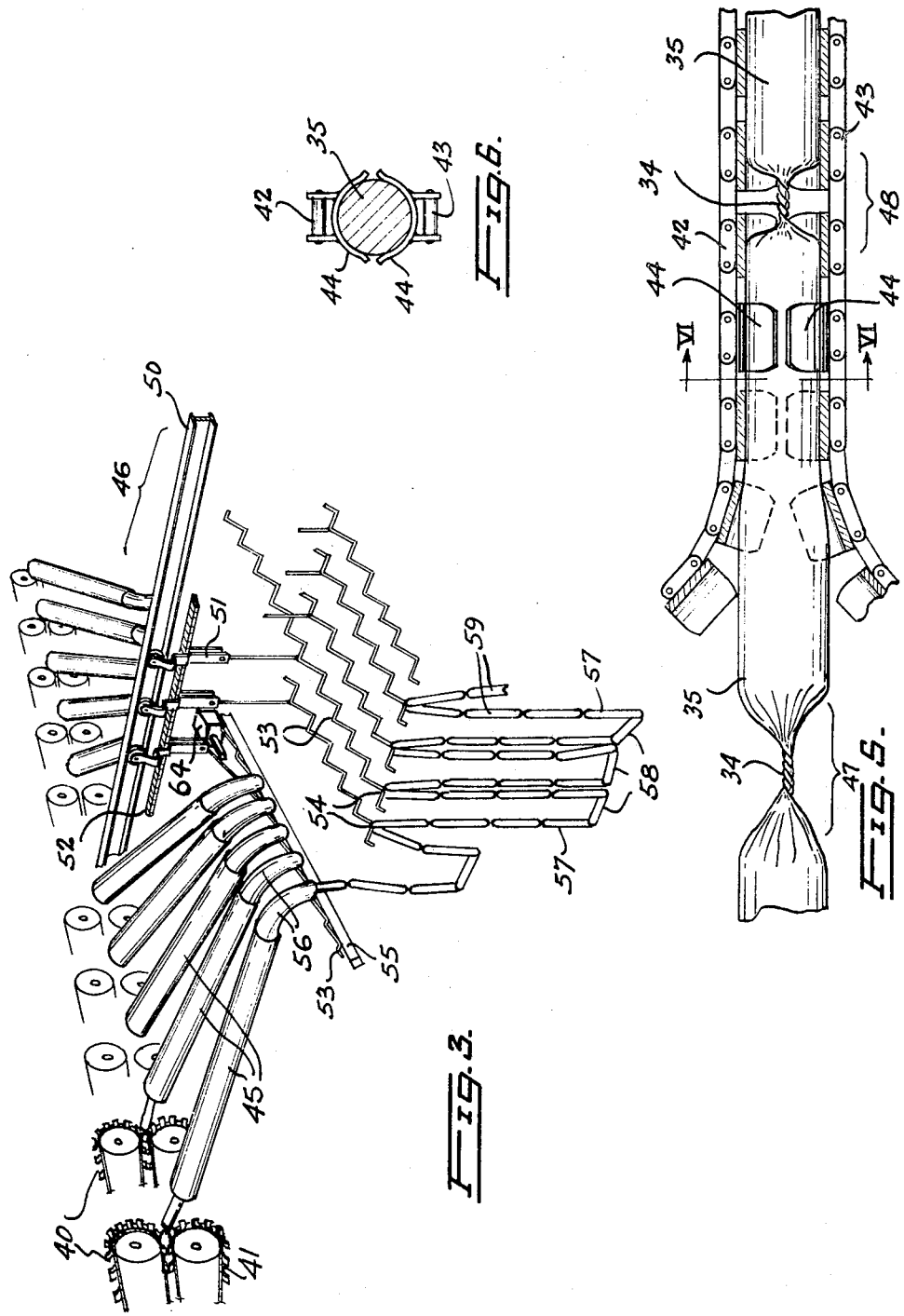

---

3,505,081
PROCESSING OF SAUSAGE PRODUCTS
William R. J. Wallace, Montreal, Quebec, Canada, assignor to Hygrade Foods Inc., Montreal, Quebec, Canada
Filed May 4, 1966, Ser. No. 547,572
Claims priority, application Canada, Apr. 1, 1966, 957,169
Int. Cl. A22c 11/00
U.S. Cl. 99—109         3 Claims

ABSTRACT OF THE DISCLOSURE

Apparatus and method for improving the transportation of a chain of cased sausage products interconnected by untied, twisted links of casing material. To reduce the tendency to untwist during susequent handling (e.g. cooking) the sausages are squeezed transversely to strain the casing material beyond its elastic limit in the vicinity of the links. In addition the chain is subjected to tension to ensure registration between the products and an indexing conveyor, regardless of any irregularities in the length of the links.

---

This invention relates to certain apparatus and methods employed in the processing and particularly the transportation for processing purposes of wieners, frankfurters or other sausage-like edible products. For simplicity, such products will from henceforth be referred to as sausages or sausage products, which terms are intended to include all the various varities that are available.

The standard method of manufacturing such products (especially in the more popular sizes, e.g. 5 to 6 inches in length) has been first to stuff a continuous tube of casing material with meat emulsion, and then to constrict the casing at intervals to divide this long tube into the required individual lengths so that each length ultimately forms an individual sausage. With the sausages thus interconnected by constricted links of the continuous casing, the whole sausage chain is passed through equipment for cooking the meat and subjecting the product to such other conditions, e.g. smoking and final chilling, as may be required. Until recently, the division of the casing into individaul sausage lengths has been carried out either manually or by a machine which ties the casing with thread to form each constriction.

In recent years the preferred manner of forming the individual sausage lengths by periodically constricting the elongated casing has undergone improvement. The more modern sausage-making machines now available no longer form the constrictions with a thread; instead they form the constrictions by simply twisting the casing. In one widely used machine, for example, the portion of the casing forming each sausage is twisted about the longitudinal axis of the chain of sausages approximately 1 and ¾ turns in relation to the immediately adjacent sausage, and so on down the entire casing length.

The modern machines that make sausages in this way embody many improvements, particularly in relation to their speed of operation, but they present the problem that the chain of sausages, after it emerges from the sausage-making machine, has a tendency to untwist. For example, if such a chain of sausages were allowed to hang vertically supported only at its upper end, the stressed constrictions in the casing would immediately unwind and the identity of the individual sausages would be lost. The chain of individual sausages would quickly become a single long casing somewhat loosely filled with meat emulsion.

After the sausage chain has been subjected to a cooking process, this tendency to unwind will have substantially or completely disappeared, but it is nevertheless necessary to handle the chains of sausages as they emerge from the sausage-making machine and to convey them in an orderly fashion into the cooking ovens. It is during this time that it is necessary to take steps to inhibit the tendency of the chain to twist.

The present invention is directed towards the provision of apparatus and methods for the transporting of such sausage chains in a particable and economical manner, while preventing their tendency to twist impeding the proper operation of the equipment.

One example of apparatus constructed in accordance with the present invention is illustrated diagrammatically in the accompanying drawings, it being understood that these drawings are provided by way of example only, and not by way of limitation of the broad scope of the invention, which latter is defined in the appended claims.

In the drawings:

FIGURE 1 is a general plan view of the entire area of the sausage handling apparatus with which this invention is concerned;

FIGURE 2 is a perspective side view of a first portion of this apparatus of FIGURE 1;

FIGURE 3 is a perspective side view of a second portion of the apparatus of FIGURE 1;

FIGURE 4 is a detailed view of a fragment of the apparatus seen in FIGURE 2;

FIGURE 5 is a side view of another fragment of the apparatus seen in FIGURE 2; and FIGURE 6 is a section on the line VI—VI in FIGURE 5.

The overall apparatus seen in FIGURE 1 shows a sausage-making machine 10 of the modern type which produces chains of cased sausage products interconnected by united twisted links of stressed casing material. Such machines are well known and are shown in Townsend United States Patent No. 3,115,668, issued Dec. 31, 1963. The machine 10 discharges each chain of sausages from a nozzle 12 which projects forwardly and sidewardly from the end of the machine 10 while rotating about the longitudinal axis of the machine. This has the result that each chain of sausages is deposited as a coil 11 on a portion 13 of a handling table 14. The table 14 includes a transversely extending portion 15 with an upstanding edge 16 and a series of partitions 17 which define ten bays 18 arranged five on each side of the centre line of the apparatus, as best appreciated from FIGURE 1. Extending along in front of the bays 18 is a flat working surface 19.

For simplicity of illustration, the apparatus has been shown empty in FIGURE 1, except for the coiled sausage chain 11, and in FIGURE 2 only the nearest bay 18 is shown containing a second coiled sausage chain 20. In practice each of the ten bays 18 will normally be in simultaneous use, but, since each of the ten units of the apparatus operates in essentially the same manner, full detail of illustration has been confined in FIGURES 2 and 3 to the nearest unit.

As each chain of sausages is deposited in coiled form on the table portion 13, an operator grasps this coil (holding the free end of the sausage at each end of the coil to prevent unwinding) and slides the coil over to one of the bays 18, let it be assumed towards the end bay 18 shown in FIGURE 2. In this bay the sausage coil 20 is already in the process of being transported through the apparatus and the trailing end 21 of the last sausage 22 of this coil 20 has been pinched between a pair of upstanding spring clips 23 mounted on an adjacent partition 17 to prevent any unwinding. The operator now ties the leading portion of the casing material of the upper end of the new coil 11 to this trailing end 21 and moves the new coil 11 into position in the bay 18 just behind or adjacent the coil 20, at the same time taking the trailing casing portion at the lower end of the coil 11 and placing it between the spring clips 23. In this way the sausage chains remain coiled, with their trailing ends either grasped by the operator or pinched between the spring clips 23 and with their leading ends either grasped by the operator or connected to the chain of sausages extending into the apparatus. They thus have no opportunity to unwind.

It will be appreciated that similar operations are carried out in each of the other bays 18. Very soon after the coil 11 has been removed from beneath the nozzle 12 of the sausage-making machine 10, this machine will begin to form a new coil of sausages, which, as soon as it is complete, will be conveyed by one of the operators to one of the other bays 18, so that all the bays can be in simultaneous use. Although these coils of sausages as produced by the machine 10 are limited in length (containing typically 160 to 170 individual sausages), the chain which is fed into each unit of the transporting portion of the apparatus is continuous and can be made as long as desired by simply joining on more of the coiled chains from the machine 10.

Each such continuous sausage chain, as exemplified by the sausage chain 30 in FIGURE 2, passes over a driven roller 31 to an indexing conveyor 32. The indexing conveyor 32 comprises a spaced series of generally U-shaped upstanding lugs 33, the lugs being spaced along the chain by a distance equal to the spacing between the casing material links 34 that join adjacent sausages. The sausage chain 30 lies along and is conveyed by the upper span of the indexing conveyor 32, with each link 34 in register with a lug 33 and with a single individual sausage 35 lying between a pair of adjacent lugs 33. Each sausage is centrally supported by a curved support surface 36 formed on the conveyor 32.

Downstream of each conveyor 32 there is located a stressing conveyor 39 in the form of a pair of caterpillar conveyor belts 40 and 41, a pair of spans 42 and 43 of which (FIGURE 5) come together to define a travelling conveyor for receiving the chain 30 of sausages 35. The caterpillar conveyors 40 and 41 comprise conventional belts on which are mounted generally semi-cylindrical rubber shoes 44 shaped to embrace each sausage 35 in the manner also seen in FIGURE 6.

There are two important considerations regarding the stressing conveyor 39 and its function in relation to the indexing conveyor 32. Firstly, the spacing between the conveyor spans 42 and 43 is slightly less than the normal diameter of the sausages 35 as they enter this assembly. This has the effect of exerting a measure of gentle squeezing on the sausages, as well as obtaining a firm grip on them for the purposes of conveying the chain 30 through the apparatus. This squeezing action serves to convert some of the stress in the end portions the casing into strain, and the casing becomes stressed beyond its elastic limit. The meat emulsion is compacted into the ends of each sausage and the tendency of the links 34 to untwist is reduced. This effect has been illustrated in FIGURE 5, in slightly exaggerated form to aid clear understanding. Compare the comparatively loose end packing between adjacent sausages shown in the area 47 before the squeezing action has taken effect with the more firmly compacted ends of the sausages in the area 48 which has been subjected to the squeezing action. It has been found in practice that this transverse squeezing action aids materially in reducing the tendency of the sausage chain to unwind, an advantage which is most valuable in the next stage of the process, which is described below.

The second important feature of the relationship between the stressing conveyor 39 and the indexing conveyor 32 is that the conveyor 39 is driven at a slightly faster linear speed. That is to say, the linear speed at which the conveyor 39 tries to pull the sausage chain is slightly greater than the driven speed of the conveyor 32. This has the effect of subjecting the chain of sausages upstream of the conveyor 39 to tension and of ensuring that the natural tendency of the chain of lag behind the indexing conveyor 32 is overridden. The conveyor 32 must convey the sausage chain 30 through the initial part of the apparatus including lifting the sausages up from the coil 20. If reliance were placed solely on the fact that the indexing conveyor 32 is power driven, there would tend to be a constant falling back of the sausage chain, with the effect that the proper registration between links 34 and lugs 33 could not be maintained. It should be appreciated that the sausages are quite rubbery and elastic. They can be relatively easily bent, stretched and otherwise distorted. Indeed, this ability to stretch, which is evident in the area 47 of FIGURE 5, is an important ingredient in the proper operation of the present method, having regard to the fact that the conveyor 39 is driven at a slightly greater linear speed than the indexing conveyor 32. Without this elasticity and a certain inevitable amount of slippage between the sausage chain and the conveyor 39 the sausage chain would either be broken or the sausages would be pulled forwardly from their proper register between lugs 33. As it is, in practice, this constant pulling forward of the sausage chain 30 by the slightly faster travelling caterpillar conveyor 39 has the effect of ensuring proper register of the individual sausages on the chain 32. However, while the tension in the sausage chain is sufficient to pull it into register, if is not already there, this tension is insufficient to pull the chain out of register, when it is already in register. Even under conditions of most careful control, the sausages occasionally enter the upstream end of the indexing conveyor 32 out of proper register between the lugs 33. This may be due to some irregularity in the sausage chain, or to the added length of interconnection between adjacent sausages that often occurs at the joint between adjacent sausage coils, i.e. when a new coil (or length) 20 of sausages is manually joined to a previous coil 20. As stated above, in each bay 18 the operator ties the leading portion of the casing material of a new coil 11 (FIGURE 1) to the trailing end 21 of the previous coil 20 (FIGURE 2). Whenever this happens (i.e. an irregularity occurs in the sausage chain, as by an unusually long link) the pulling caterpillar conveyor 39 ensures that, at least by the time the sausages reach the downstream end of the indexing conveyor 32, they will be properly in register therewith.

The importance of this correct register will become apparent from the consideration that is now to be given to the further handling of the sausage chains. Downstream of the conveyor 39, th sausages enter a tube 45 by which they are conveyed to a T-bar conveyor 46 as shown in FIGURE 3. This T-bar conveyor 46 comprises a conveyor rail 50 on which a series of hangers 51 travel, being pulled along by a chain 52. The direction of travel is from left to right in FIGURE 3 and each hanger 51 carries a so-called T-bar 53, horizontal arms of which are corrugated to provide ten notches 54 with each of which a link 34 between a pair of sausages is engaged. For simplicity of illustration in FIGURE 3, only the outermost sausage chain 30 has been shown, but it will be appreciated that in full operation of the machine ten such sausage chains located side by side across the full width of the apparatus will be simultaneously loaded onto the T-bar conveyor 46.

A fixed transverse bar 55 momentarily holds back each T-bar 53 until progress of the conveyor 46 draws the T-bar 53 over the top of the bar 55. The T-bar then falls into a vertical position substantially directly beneath downwardly projecting nozzles 56 of the tubes 45. Thus as each T-bar 53 passes over the bar 55 and falls into place immediately beneath a row of nozzles 56 it causes each of its notches 54 to engage a link between a pair of sausages of the respective hanging sausage chain. The speed and timing of travel of the T-bars 53 is related to the speed of travel of the sausage chains as determined by the indexing conveyors 32, so that a predetermined number of sausages hangs in each loop 57 between adjacent T-bars 53. All the conveyors may run continuously, in which case the timing is achieved as a result of careful control over their relative speeds. Alternatively, the conveyors 32 and 39 can operate intermittently, being triggered by a microswitch 64 sensitive to dropping down of each fresh T-bar 53 beyond the bar 55. The conveyors 32 and 39 would then run for a sufficient time to convey a further desired number of sausages through the tubes 45 and would then stop until the next T-bar 53 moved down to engage the hanging chain of sausages, whereupon the cycle would repeat. Whichever form of timing is used it is preferably arranged that an odd number of sausages appears in each loop (for example nine or eleven sausages), to ensure the existance of a transversely extending sausage 58 at the bottom of each loop. This transverse sausage tends to keep the two vertical portions 59 of each loop 57 spaced apart, and insofar as the loops 57 may still contain some tendency to twist, the sausage 58 tends to prevent the vertical portions 59 of the loops 57 twisting tightly around one another. This is valuable, because, when the sausage chains mounted on the T-bar conveyor pass into the cooking apparatus shown generally at 60 in FIGURE 1, it is important for considerations of uniform cooking that air be able to circulate freely between the individual sausages of each loop and chain. It also helps to eliminate "touch marks," namely blemishes arising out of sausages remaining in contact during further processing.

Each indexing conveyor 32 and its associated stressing conveyor 39 is power driven from a suitable source of power, e.g. an electric motor. Apart from a symbolic showing of a drive mechanism 61 for the conveyor 46, which mechanism includes shafts 62 and 63 extending to the conveyors 32 and 39, the details of the drives to the parts have been omitted from the drawings in the interests of simplicity and since such parts are conventional and simply comprise motors, shafts, chains, sprockets and the like.

I claim:
1. In a method of transporting a chain of cased sausage products interconnected by twisted links of casing material by means of a conveyor having a plurality of lugs uniformly spaced apart therealong by a distance corresponding to the desired spacing between said links so as to ensure registration of each link with a said lug at least by the time the products reach the downstream end of the conveyor regardless of whether the products enter the upstream end of the conveyor with their links in register with the lugs; said method comprising subjecting said chain from a location beyond the downstream end of the conveyor to tension sufficiently to draw the chain of products along said conveyor faster than the linear speed thereof when necessary to move at least the link most downstream on the conveyor into registration with a said lug but insufficient to draw such most-downstream link out of such registration.

2. A method according to claim 1, including the step of subjecting each said sausage product of said chain substantially uniformly along the length and around the girth of said product to a transverse squeezing action to stress said casing material in the vicinity of said links beyond its elastic limit to convert some of the stress therein to strain and thereby reduce the tendency of said links to untwist.

3. In a method of transporting a chain of cased sausage products interconnected by untied, twisted links of stressed casing material, the step of subjecting each sausage product of said chain substantially uniformly along the length and around the girth of said product to a transverse squeezing action to stress said casing material in the vicinity of said links beyond its elastic limit to convert some of the stress therein to strain and thereby reduce the tendency of said links to untwist.

References Cited

UNITED STATES PATENTS

| | | | |
|---|---|---|---|
| 1,938,070 | 12/1933 | Friedler | 17—45 X |
| 3,115,668 | 12/1963 | Townsend | 17—33 |
| 2,183,687 | 12/1939 | Miller | 17—34 |

FOREIGN PATENTS

| | | |
|---|---|---|
| 125,161 | 4/1959 | Russia. |

HYMAN LORD, Primary Examiner

U.S. Cl. X.R.

17—49